(12) United States Patent
Beckhusen et al.

(10) Patent No.: US 7,775,438 B2
(45) Date of Patent: Aug. 17, 2010

(54) INTEGRATED HOUSING AND BATTERY PACK FOR PORTABLE DATA TERMINALS

(75) Inventors: Gerard F. Beckhusen, Baldwinsville, NY (US); Timothy R. Fitch, Syracuse, NY (US); Gerald P. Joyce, III, Charlotte, NC (US); Paul B. Weslake, Waxhaw, NC (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 1035 days.

(21) Appl. No.: 11/465,213

(22) Filed: Aug. 17, 2006

(65) Prior Publication Data

US 2008/0048971 A1 Feb. 28, 2008

(51) Int. Cl.
*G06K 7/10* (2006.01)
(52) U.S. Cl. .............................. 235/472.01; 235/462.43; 235/462.45; 235/462.49; 235/472.02; 235/472.03
(58) Field of Classification Search ............ 235/462.01, 235/462.43, 462.45, 462.46, 462.48, 462.49, 235/472.01–472.03; 361/156, 168, 679.56
See application file for complete search history.

(56) References Cited

U.S. PATENT DOCUMENTS

| 5,401,591 | A | * | 3/1995 | Bishay et al. | ................. | 429/97 |
|---|---|---|---|---|---|---|
| 5,656,804 | A | * | 8/1997 | Barkan et al. | .......... | 235/472.01 |
| 5,801,918 | A | * | 9/1998 | Ahearn et al. | .......... | 361/679.55 |
| D473,186 | S | | 4/2003 | Grosfeld et al. | | |
| D488,436 | S | | 4/2004 | Wulff | | |
| D503,673 | S | | 4/2005 | Rosengrant | | |
| D504,110 | S | | 4/2005 | Berentzen et al. | | |
| D512,427 | S | | 12/2005 | Choi et al. | | |
| 7,325,743 | B2 | * | 2/2008 | Hamilton et al. | ........ | 235/472.02 |
| 2003/0222148 | A1 | * | 12/2003 | Schmidt et al. | ........ | 235/462.45 |
| 2004/0204169 | A1 | * | 10/2004 | Goradesky | ............... | 455/569.1 |

* cited by examiner

*Primary Examiner*—Thien M. Le
*Assistant Examiner*—Tuyen K Vo
(74) *Attorney, Agent, or Firm*—Hiscock & Barclay, LLP

(57) ABSTRACT

A housing for a portable computing device. An upper surface of the housing facilitates access to at least one interface component. A lower surface of the housing defines a cavity to receive a battery pack. A battery pack, adapted to fit within the cavity, defines at least a portion of a first ridge for receiving an operator's finger, the first ridge having a generally curved configuration enabling said housing to be comfortably held in an operator's hand when the operator's hand is in its naturally relaxed position.

32 Claims, 15 Drawing Sheets

INTEGRATED HOUSING AND BATTERY PACK FOR PORTABLE DATA TERMINALS

BACKGROUND OF THE INVENTION

Portable data terminals (PDTs) are a type of data collection devices used to collect, interpret, process, and ultimately transfer data to a larger data processing system. PDTs generally integrate a mobile computer, an alpha-numeric or numeric keypad, and at least one data acquisition device. The mobile computer portion is generally similar to known touch screen consumer oriented portable computing devices (e.g. "Pocket PCs" or "PDAs"), such as those available from PALM, HEWLETT PACKARD, and DELL. It is to be noted that PDTs differ from consumer oriented portable computing devices through the integration of more durable or "industrial" versions of their constituent components. The data acquisition device generally comprises a device that captures data from an encoded source, for example, radio frequency IDs (RFID), images, and bar codes. Additional data acquisition devices may also be provided, notably, most PDTs have an integrated keypad. A PDT may also integrate one or more wireless communication technologies, such as GSM, CDMA, 802.11 and BLUETOOTH. PDTs tend to provide improved power performance by utilizing superior batteries and power management circuits. PDTs are available from several sources, including the assignee of the present application: HAND HELD PRODUCTS. INC.

U.S. Pat. No. 5,801,918 issued Sep. 1, 1998, incorporated herein by reference, was the first to describe an ergonomic housing for a PDT having a finger saddle defined between the front portion and the rear portion. A finger saddle receives an operator's finger and enables the housing to be comfortably held in an operator's hand when the operator's hand is in a naturally relaxed position. FIG. 1 is an illustration of the PDT described in the '918 patent.

The PDT 11 has a generally rectangular housing, generally indicated as 12, which both protects the internal component from the elements and abuse associated with use, and determines the ergonomic and functional interaction with the operator. The housing 12 has an upper surface 14 and a lower surface 16. The upper surface 14 has a generally rectangular configuration in top plan view with a generally planar uppermost surface.

The upper surface 14 generally provides access to interface components of the PDT 11, including a data acquisition initiation key 18 (e.g. scan key); a display 20 and key pad 22. Additionally, a thumb rest 39 may be provided.

The lower surface 16 generally provides a finger saddle 28 and access to a battery pack 34. The shape of the housing of the battery pack 34 is integrated with the rear of the lower surface 16—behind the finger saddle 28. The finger saddle 28 is formed between a front portion 24 and a rear portion 26 of the housing generally forward of the battery pack 34. As shown, the finger saddle 28 has a generally U-shaped configuration which forms a channel across the housing 12 generally perpendicular to a longitudinal axis X of the housing, so as to separate the front portion 24 and the rear portion 26. The finger saddle 28 also has a second U-shaped configuration parallel to the longitudinal axis of the housing 12 and conforms to the natural contour of an operator's relaxed finger.

The combination of the two U-shapes allows the finger saddle 28 to comfortably receive an operator's finger when the hand of the operator is in its naturally relaxed position. The aspect of the U-shaped configuration which is parallel to the longitudinal axis X of the housing 12 allows the finger saddle 28 to be tapered along the sides of the housing to provide beveled portions 35, making the interaction between an operator's hand and the housing more comfortable. This ergonomic feature helps to reduce hand and wrist fatigue, thereby improving the overall comfort of the housing.

Finger saddles, in accordance with those described in the '918 patent are now a common feature on a variety of PDTs. For example, the SYMBOL model MC3070 incorporates a finger saddle formed by a lower housing and a battery compartment door. However, since the inception of the finger saddle, the technology in and around PDTs has advanced significantly. For example, current PDTs incorporate larger full color displays with integrated touch screens. Also an ever increasing number of radio communication devices, such as GSM and Wi-Fi are integrated into current PDTs. It is further expected that form factors will be reduced from generation to generation. This will further increase the challenge of providing a device incorporating ergonomic features such as finger saddles.

FIG. 2 is a block diagram of a known PDT 200 having a more current configuration as compared with the PDT 11 shown in FIG. 1. A central processing unit (CPU) 202 receives data from and outputs data to other sub-systems for storage, transmission and additional processing. The CPU 202 typically comprises one or more of a number of off the shelf solutions including: embedded processors, such as an XSCALE processor available from INTEL; general purpose processors, such as a PENTIUM 4 available from INTEL; or any number of custom solutions including pre-configured field programmable gate arrays (FPGAs) and application specific integrated circuits (ASICs). Overall operation of the CPU 202 is controlled by software or firmware (typically referred to as an operating system) stored in one or more memory locations 205n, including RAM 205a and FLASH memory 205b. Examples of suitable operating systems for the PDT 200 include graphical user interfaces such as WINDOWS MOBIL, WINDOWS CE, WINDOWS XP, LINUX, PALM, and OSX.

In general, communication to and from the CPU 202 and among the various sub-components takes place via one or more ports or busses, including a main system bus 204; a plurality of Universal Asynchronous Receiver/Transmitter (UART) ports 206n; and a Dual Universal Asynchronous Receiver/Transmitter (DUART) 210.

A variety of secondary processors may be provided to perform general and application specific functions. The example illustrated in FIG. 2 provides three such processors: a field programmable gate array (FPGA) 212; an auxiliary processor 214; and an LCD controller 216. The FPGA 212 may comprise any number of FPGAs including the Virtex-4 family of FPGAs available from XILINX. The FPGA 212 is used to interface with certain data acquisition system as described hereinafter. The auxiliary processor 214 may comprise any number of embedded (or general purpose) processors, including the PICmicro® family of microcontrollers available from MICROCHIP TECHNOLOGY. The auxiliary processor 214 interfaces with and controls a variety of data input devices including, for example a touch sensitive panel 222, a keypad 224, and a scan key or trigger 226. The LCD controller 216 may comprise any number of available controllers including, for example, one of the available EPSON LCD controllers. As its name and connections suggest, the LCD controller 216 controls the display of images on an LCD display 220, such as any number of displays available from SHARP. The combination of the LCD 220 and the touch sensitive panel 222 is often referred to as a "touch screen."

The PDT 200 may further include a plurality of communication links such as an 802.11 communication link 240, an IR communication link 242, a Bluetooth communication link 244, and a cellular communication link 246 for communication with a cellular network such as a network in accordance with the Global System for Mobile Communications (GSM). The 802.11 communication link 240 interfaces with the CPU 202 via the main system bus. The IR communication link 242, and Bluetooth communication link 244 are connected to the CPU 202 via UART channels 206n. The cellular communication link 246 is connected to the CPU 202 via the DUART 210. Wired communication may be conducted via a UART, such as the UART 206e. Each of the communication links facilitates communication with a remote device and is principally used to transfer and receive data.

In use, the PDT 200 may be configured to activate a data acquisition system based on the actuation of a key on the keypad 224 (including the Trigger 226) or a touch on the touch panel 222. A variety of suitable data collection systems are available for integration into the PDT 200, for example an image signal generation system 250 and an RFID reader unit 260. The image generation system 250 operates in conjunction with the FPGA 212 to generate image frames which may either be stored as images or analyzed to extract data, such as bar code data, there from. Possible configurations of the FPGA 212 are illustrated in U.S. Pat. No. 6,947,612 incorporated herein by reference. The RFID reader unit 260 reads and extracts data from RF signals.

The image signal generating system 250 generally comprises a two dimensional solid state image sensor 252, available in such technologies as CCD, CMOS, and CID, for capturing an image containing data. e.g. an, image, a bar code or a signature. Two-dimensional solid state image sensors generally have a plurality of photo sensor picture elements ("pixels") which are formed in a pattern including a plurality of rows and a plurality of columns of pixels. The image signal generating system 250 further includes an imaging optics (not shown) focusing an image onto an active surface of the image sensor 252. Image sensor 252 may be incorporated on an image sensor IC chip having disposed thereon image sensor control circuitry, image signal conditioning circuitry, and an analog-to-digital converter. FPGA 212 manages the capture and transfer of image data into memory 205n. Decoding may be performed by the CPU 202 or any suitable secondary processor. Examples of suitable image signal generation system 250 include an IMAGETEAM 5x00VGA/5x00MPX imaging module of the type available from Hand Held Products, assignee of the present application.

One use of the image signal generating system 250 is reading and interpreting bar codes such as bar code 275 on an item 270. In this mode, when trigger button 226 is actuated, the CPU 202 cause the appropriate control signals to be sent to the image sensor 252. In response thereto, the image sensor 252 outputs digital image data including (hopefully) an adequate representation of the bar code symbol 275. This data is acquired by the FPGA 212 where it is collected and subsequently transferred to memory 205n. In accordance with a decoding program (not specifically illustrated) an attempt may be made to decode the bar code represented in the captured digital image representation. The capture and decoding of image data may occur automatically in response to a trigger signal being generated, usually by activation of the trigger 226 or a pre-selected key on keypad 224. For example, the CPU 202 may be configured, typically through execution of a program resident in memory 205n, to continuously capture and decode bar code symbols represented therein until either a successful decode is completed or the trigger 226 is released. The cycle may also be terminated by timing out after a number of unsuccessful decode attempts.

In addition to having a decode mode of operation, the image signal generation system 250 may also be configured for an image capture mode of operation. In an image capture mode of operation, an electronic image representation is captured without attempting a decode. The captured electronic image representation may be one or more of (i) stored into a designated memory location of memory 205n, (ii) transmitted to an external spaced apart device, or (iii) displayed on LCD 220. This mode may be used to capture, for example an image of a signature or damage to a package.

The RFID reader unit 260 includes an RF oscillation and receiver circuit 262 and a data decoder 264. RFID reader unit 260 may be configured to read RF encoded data from a passive RFID tag, such as tag 277, which may be disposed on article 270. In such a case. RF oscillation and receiver circuit 262 transmits a carrier signal to the passive tag which in turn converts the carrier energy to voltage form and actuates a transponder (not shown) to transmit a radio signal representing the encoded tag data. RF oscillator and receiver circuit 262, in turn, receives the radio signal from the tag and converts the data into a digital format. Data decoder 264, typically including a low cost microcontroller IC chip, decodes the received radio signal information received by RF oscillator and receiver circuit 262 to decode the encoded identification data originally encoded into RFID tag 277.

RFID reader unit 260 may, for example, operate in a selective activation mode or in a continuous read operating mode. In a selective activation mode, RFID reader unit 260 broadcasts radio signals in an attempt to activate a tag or tags in its vicinity in response to an RFID trigger signal being received. In a continuous read mode, the RF oscillation and receiver circuit 262 continuously broadcasts radio signals in an attempt to actuate a tag or tags in proximity with unit automatically, without receiving a trigger signal. PDT 200 may be configured so that the CPU 202 recognizes a trigger signal under numerous conditions, such as: (1) actuation of the trigger 226; (2) receipt of an RFID trigger instruction; or (3) a determination that some other predetermined condition has been satisfied.

In a PDT, such as PDTs 1 and 200, ergonomics is a significant differentiator between completing products. Users of such devices may spend a significant amount of time each day with the unit in hand. With the awareness of injuries that may be associated with repetitive motion, and the desire to have a comfortable housing ergonomic considerations have become an essential factor in determining the shape of the micro computer housing. As a result, manufacturers have attempted to develop housings which combine ergonomic, functional, and aesthetic considerations. The ergonomic component of the desired micro computer has lead manufacturers to modify the shape of the housing to make it fit an operator's hand more comfortably. The present inventors have recognized a need to provide increased flexibility with the placement and shape of finger saddles to facilitate integration with current and future PDT designs.

BRIEF DESCRIPTION OF THE DRAWINGS

An understanding of the present invention can be gained from the following detailed description of the invention taken in conjunction with the accompanying drawings of which.

DETAILED DESCRIPTION

Figure 1:
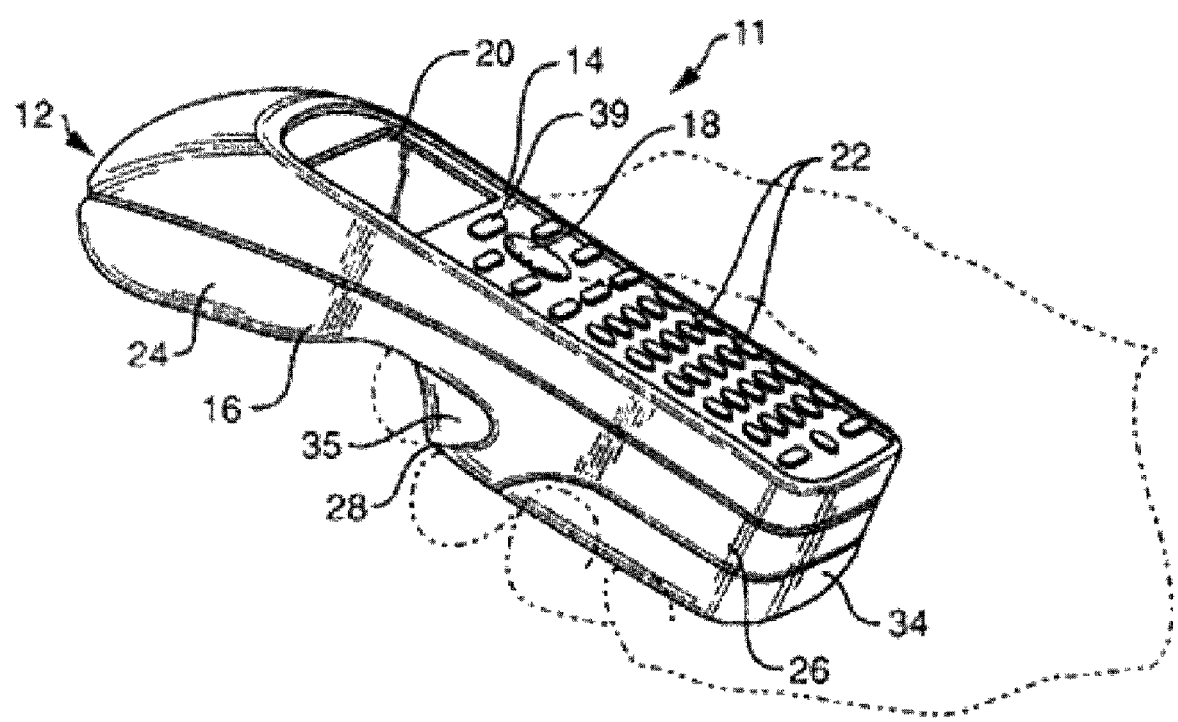
FIG. 1 is an isometric view of a known PDT.
Figure 2:
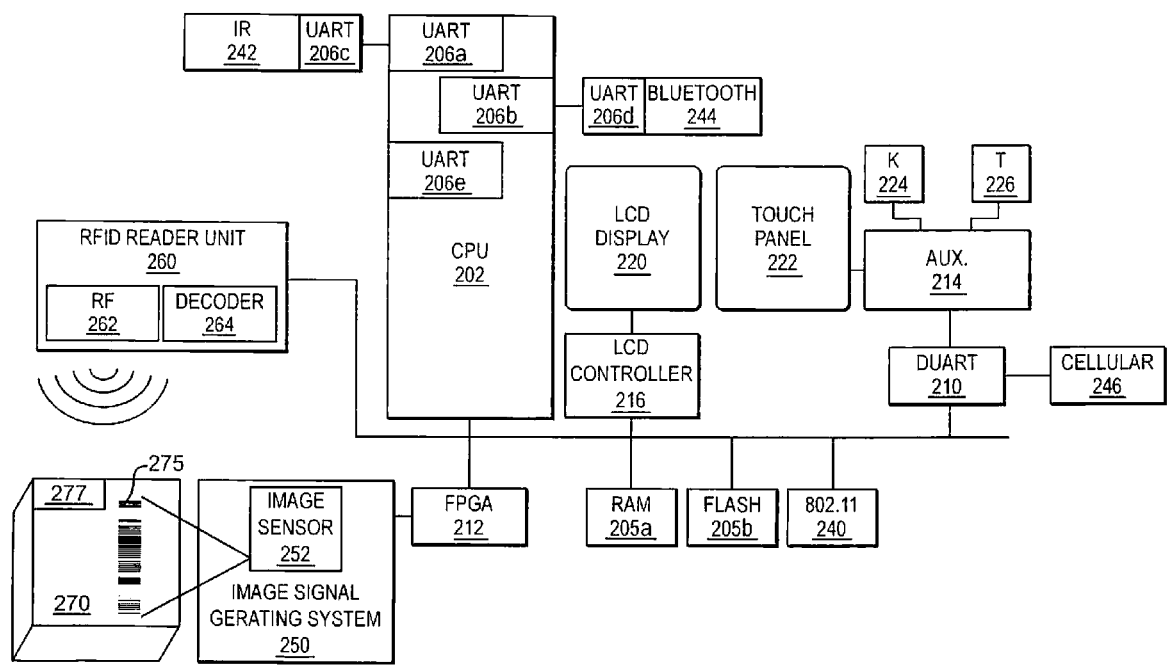
FIG. 2 is a block diagram of a known PDT.

Reference will now be made in detail to the present invention, examples of which are illustrated in the accompanying drawings, wherein like reference numerals refer to like elements throughout. It is to be noted that an element number followed by a letter generally indicates multiple occurrences of similar, either in structure or function, elements. Further, the use of an italicized "n" associated with an element number generally denotes either an unspecified instance of such element or a partial or complete grouping of such elements—the meaning of which is to be drawn from the context of such use.

The following description will use nomenclature associated with a PDT, however those of ordinary skill in the art will recognize that the present invention is applicable to a variety of other portable devices including bar code scanners, consumer electronics (including portable computing devices, portable radios, televisions and cell phones), and the like. It is anticipated that a variety of portable devices will benefit from the present invention, including the embodiments thereof described herein.

Figure 3A:
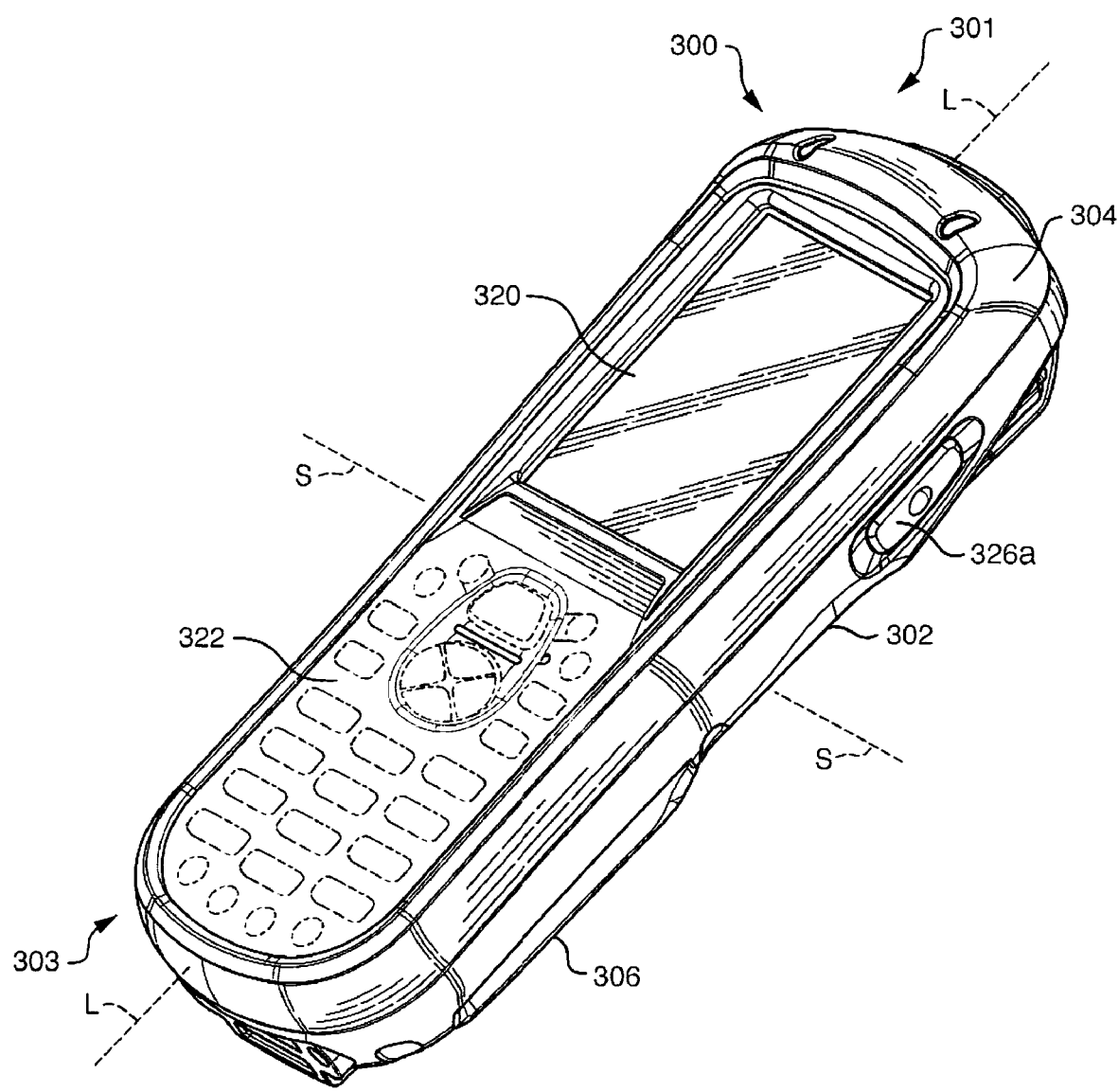
FIG. 3a is an isometric view of a PDT in accordance with an embodiment of the present invention.

FIG. 3a is an isometric view of a bar shaped PDT 300 in accordance with an embodiment of the present invention. The view in FIG. 3a illustrates an upperside of the PDT 300. The PDT 300 generally comprises a lower shell 302, an upper shell 304 and a battery pack 306. The battery pack 306 generally comprises a housing (an upper surface of which is visible in FIG. 3a); one or more cells (not illustrated); and circuitry associated with the cells (also not illustrated). The circuitry generally assists with charging and maintenance of the cells.

The upper shell 304 is configured to facilitate access to a keypad 322 and a combination touch panel/LCD 320 (hereinafter referred to as touch screen 320). Additional keys 326n are located on the sides of the PDT 300. For purposes of clarity, the present description utilizes two major axis: a long axis L extending longitudinally through the PDT 300 (from a top end 301 to a bottom end 303) and a short axis S extending perpendicular to the long axis L and generally parallel to a plane formed by the touch screen 320.

Figure 3B:
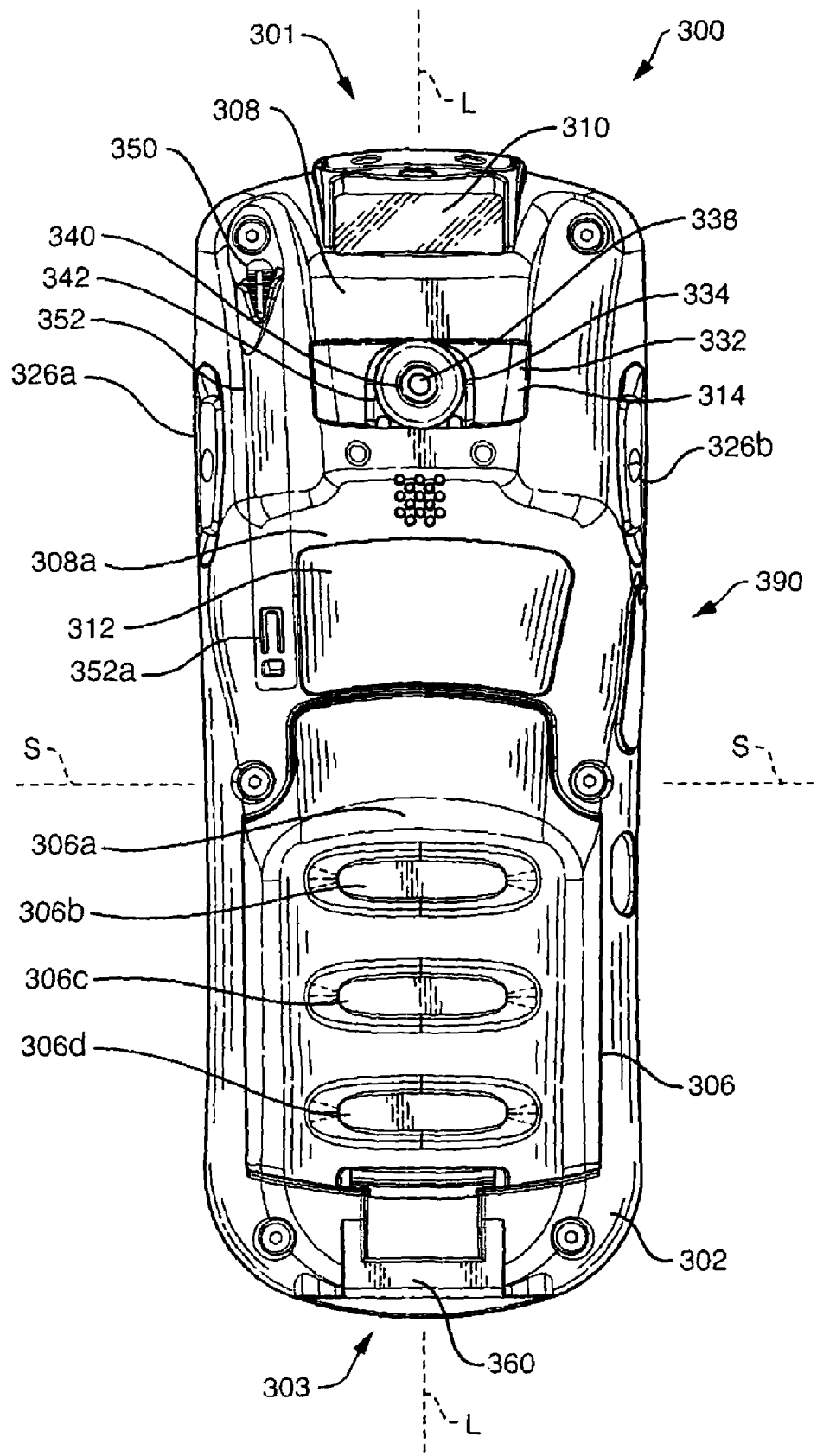
FIG. 3b is a rear plan view of a PDT in accordance with an embodiment of the present invention.

FIG. 3b is a rear plan view of a PDT 300 in accordance with an embodiment of the present invention. The view in FIG. 3b illustrates the underside of the PDT 300 generally comprising a battery pack 306, a scanner 310, and an accessory interface 314 are associated with the lower shell 302.

A finger saddle 303 is formed by the housing of the battery pack 306, the lower housing 302, and a raised portion 308 of the lower shell 302. In particular, the battery pack 306 forms a curved ridge 306a defining a first curve of the finger saddle 303. The curved ridge 306a supports a user's finger in a comfortable position in a relief 312. The relief 312 forms a channel generally parallel with the short axis S of the lower shell 302 across the lower shell 302 between the curved ridge 306a and a ridge 308a formed by the raised portion 308. The finger saddle 303 is also defined by a second curve along the long axis L of the PDT 300 (best seen in FIG. 3c). The second curve is defined by the slopes of the ridges 306 and 308a and the relief 312. The finger saddle 303 also defines a third curve stretching across the short axis S and perpendicular to the first and curved surfaces of the finger groove (this is also best understood with reference to FIG. 3c). The third curve is formed by the surface of recess 312 curving about the longitudinal axis.

One of the more useful features of the finger saddle 303 is providing a surface against which the user may exert a force generally pulling the PDT 300 toward the palm of the hand. This provides a feeling of stability while providing a secure comfortable grip on the PDT 300. While a particular shape and configuration of the finger saddle 303 has been described, it will be recognized that the finger saddle 303, and in particular the ridge 306a may comprise any shape which comfortably receives and supports one or more of an operator's fingers when the hand of the operator is in its naturally relaxed position. The remaining fingers of a users hand will generally rest on the battery pack 306. To provide further stability to a user, the battery pack 306 may be provided with one or more finger grooves, such as the grooves 306b, 306c, and 306d.

On the bottom end 303, a strap retention feature 360 is provided to secure one end of a strap. The strap retention feature 360, as illustrated, comprises a slot formed in the lower housing 302 through which one end of a strap may be passed. Alternative configurations include the securing of a metal or plastic bar within the housing.

Figure 3C:
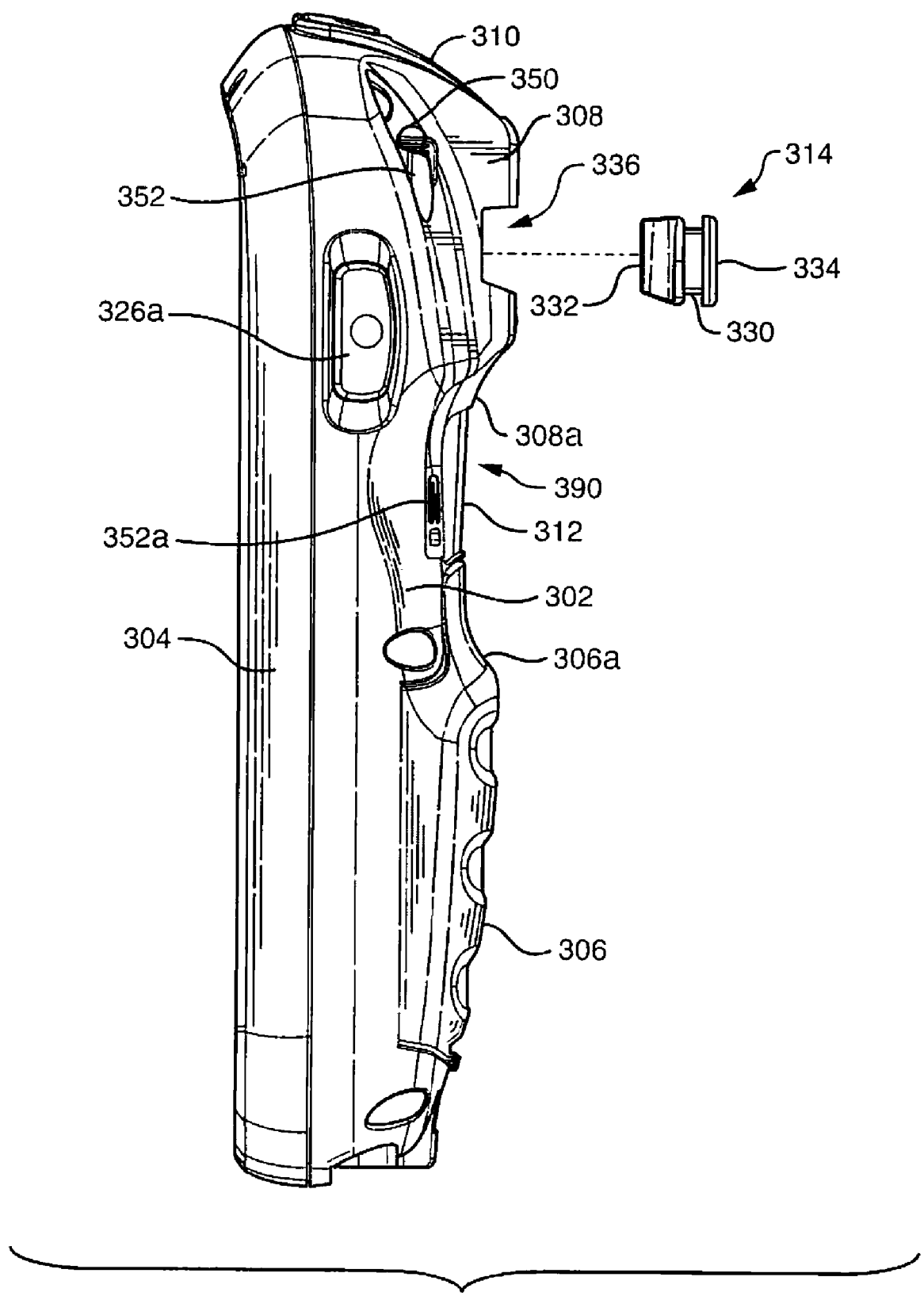
FIG. 3c is a side view of a PDT in accordance with an embodiment of the present invention.

FIG. 3c is a side view of a PDT in accordance with an embodiment of the present invention. Of note. FIG. 3c illustrates the accessory interface 314 removed from the lower housing 302. The accessory interface 314 provides a mechanical attachment point and may further provide an electrical interface for power and/or a communication. In the embodiment illustrated in FIG. 3, the accessory interface 314 generally comprises a column 330 extending from a base 332 and a disc 334 attached to the column 330 opposite the base 332, wherein the disc 334 has a larger diameter than a portion of the column 330 next to the disc 334. The base 332 mates with a reciprocal channel or groove 336 in the lower housing 302.

Referring to FIG. 3b, the accessory interface 314 may be secured within the groove 336 using a screw 338. This arrangement facilitates easy removal and replacement of the accessory interface 314. Optionally, an electrical connection may be provided on the accessory interface 314. For example, contact rings 340 and 342 may be provided on the surface of the disc 334. Alternatively, a barrel connector may be placed inside of the column 330. In yet another embodiment, connection pads may be located on the column 330 and/or the disc 334. Electrical connection between the groove 336 and the accessory interface 314 may be made via any number of mechanical interfaces including, for example, pogo pins or pads.

Figure 3D:
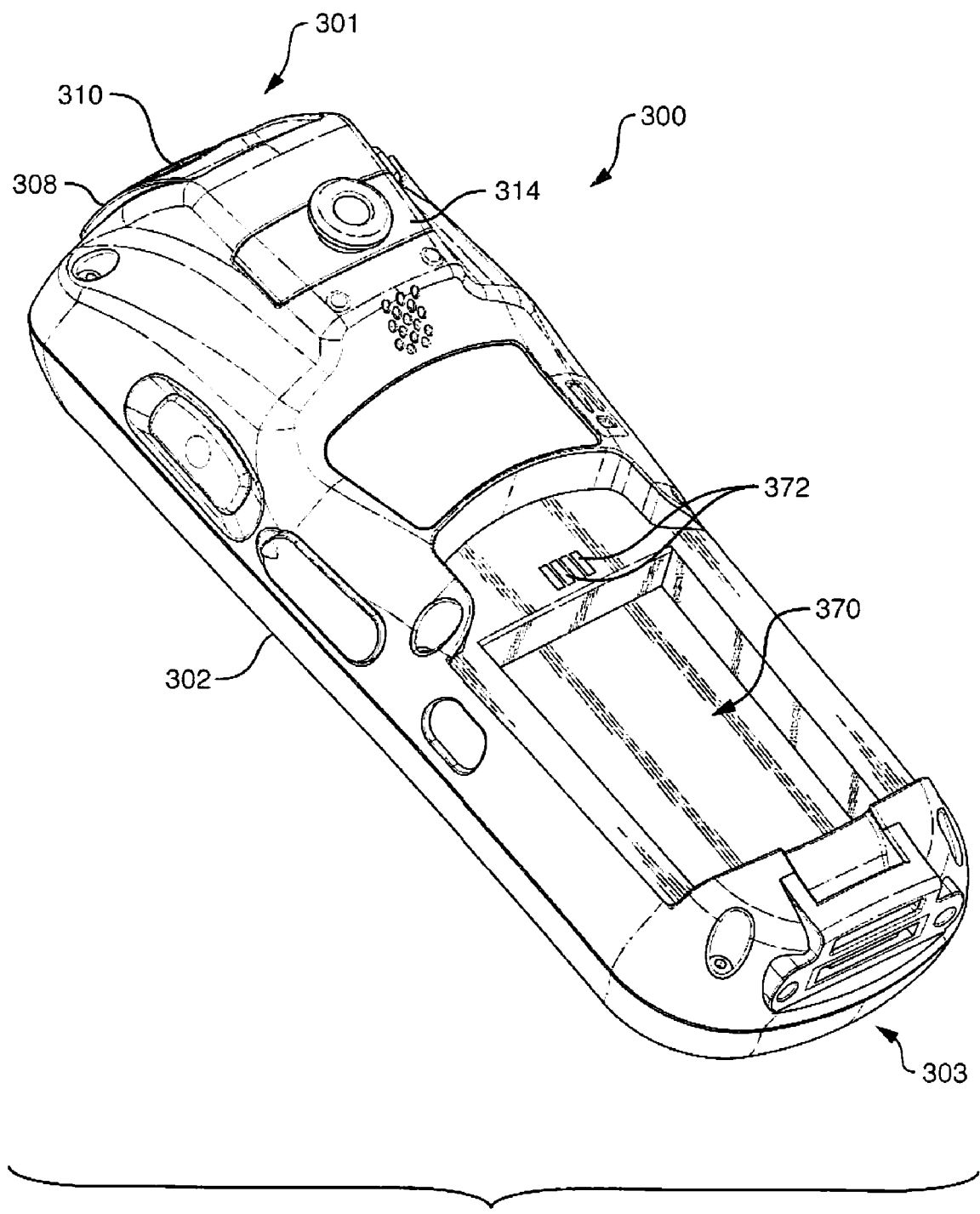
FIG. 3d is an isometric view of a PDT with a battery removed.

FIG. 3d is an isometric view of a PDT with a battery removed. This figure illustrates the battery well 370 and the electrical contacts 372.

Figure 4A:
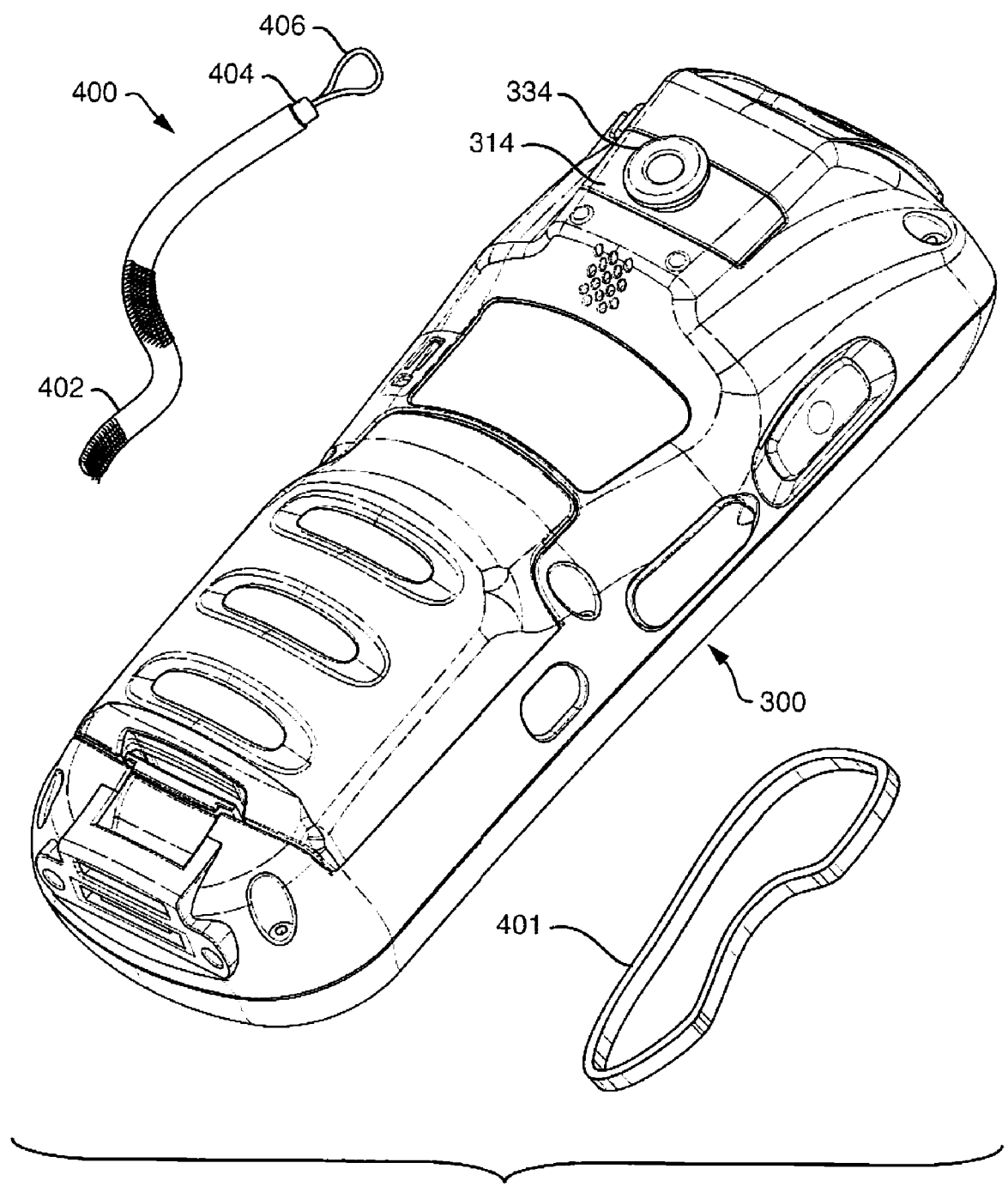
FIG. 4a is an isometric view of a PDT and hand strap.

FIG. 4a is an isometric view of a PDT 300 and hand strap 400. The hand strap 400 includes a first end 402 provided with VELCRO and a second end 404 provided with a loop 406. The loop 406 may be made of elastic material so as to require stretching to slip over the disk 334. The hand strap 400 would, when secured to the strap retention feature 360 and looped around the column 330 (secured by the disc 334) of the accessory interface 314, function to secure the PDT 300 to the hand of a user—when the hand is inserted between the hand strap 400 and the PDT 300.

An alternative hand strap 401 is also illustrated. The alternative hand strap 401 simply comprises a band of stretchable material such as elastic, rubber or some other polymer. For example, a small diameter bungee cord may be used. The hand strap 401 would, when secured to the strap retention feature 360 and looped around the column 330 (secured by the disc 334) of the accessory interface 314, function to secure the PDT 300 to the hand of a user—when the hand is inserted between the hand strap 401 and the PDT 300. By simply pulling the hand strap off the accessory interface 314, it becomes a loop through which a user may insert his or her hand.

Figure 4B:
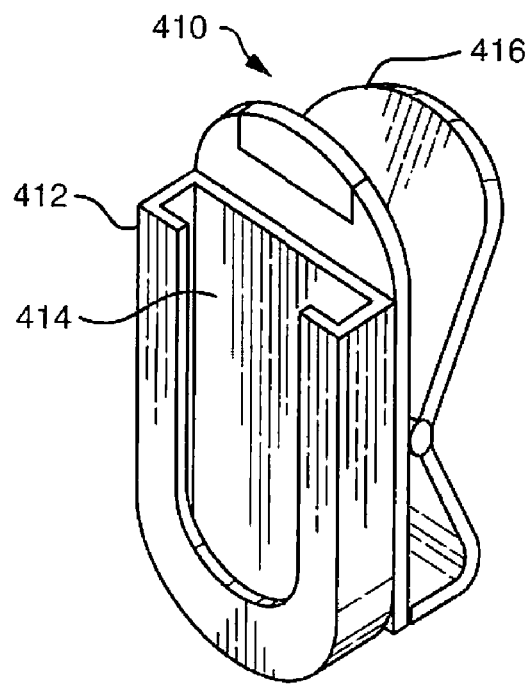
FIG. 4b is an isometric view of an accessory bracket.

FIG. 4b is an isometric view of a belt clip 410. The belt clip 410 generally comprises a housing 412 that forms a slot 414 for receiving and securing the disk 334. Spring biased jaws (not shown) may be provided to secure the column 330 within the slot. The jaws may be separated by a button 416 to facilitate insertion and removal of the PDT 300. The belt clip 410 includes a spring loaded clip 416 for attaching to a users belt.

Figure 4C:
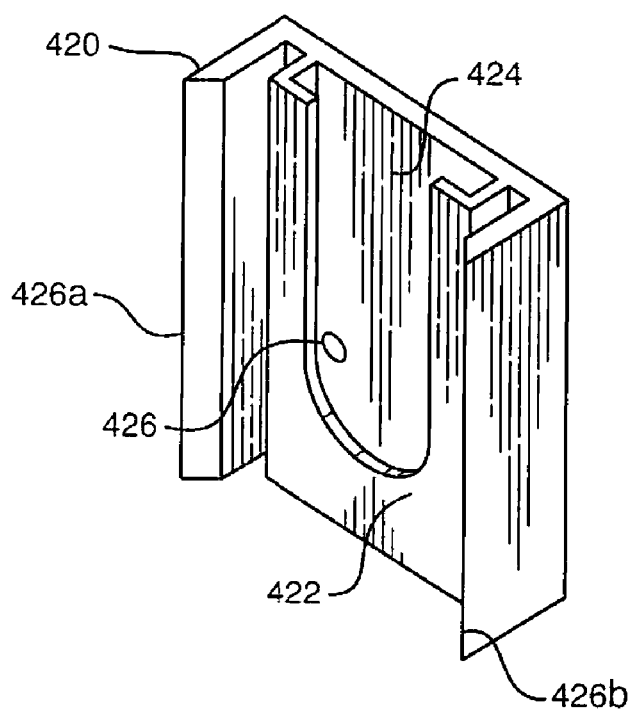
FIG. 4c is an isometric view of an accessory bracket.

FIG. 4c is an isometric view of an accessory bracket 420. The accessory bracket 420 may be affixed to (or integrally molded with) an accessory and functions to mechanically secure and electrically connect the accessory to the accessory interface 314 (and hence the PDT 302). The accessory bracket 420 generally comprises a housing 422 that forms a slot 424 for receiving and securing the disk 334. The housing 422 also comprises contoured ribs 426a and 426b that match the contour of the lower housing 302 and provide support for the accessory bracket 420 and any associated accessory (not illustrated). The housing 422 supports one or more electrical contacts 426 for the transmission of power and/or data to and from any accessory associated with the bracket 420. Associated accessories may include batteries, automated data collection devices, hand grips, storage devices (such as FLASH memory and optical disks), and a variety of input/output devices (e.g. display screens, keyboards, headsets, microphones, and speakers). The accessory bracket 420 may be directly connected to a housing associated with the accessories or may be remotely connected a cable.

Figure 4D:
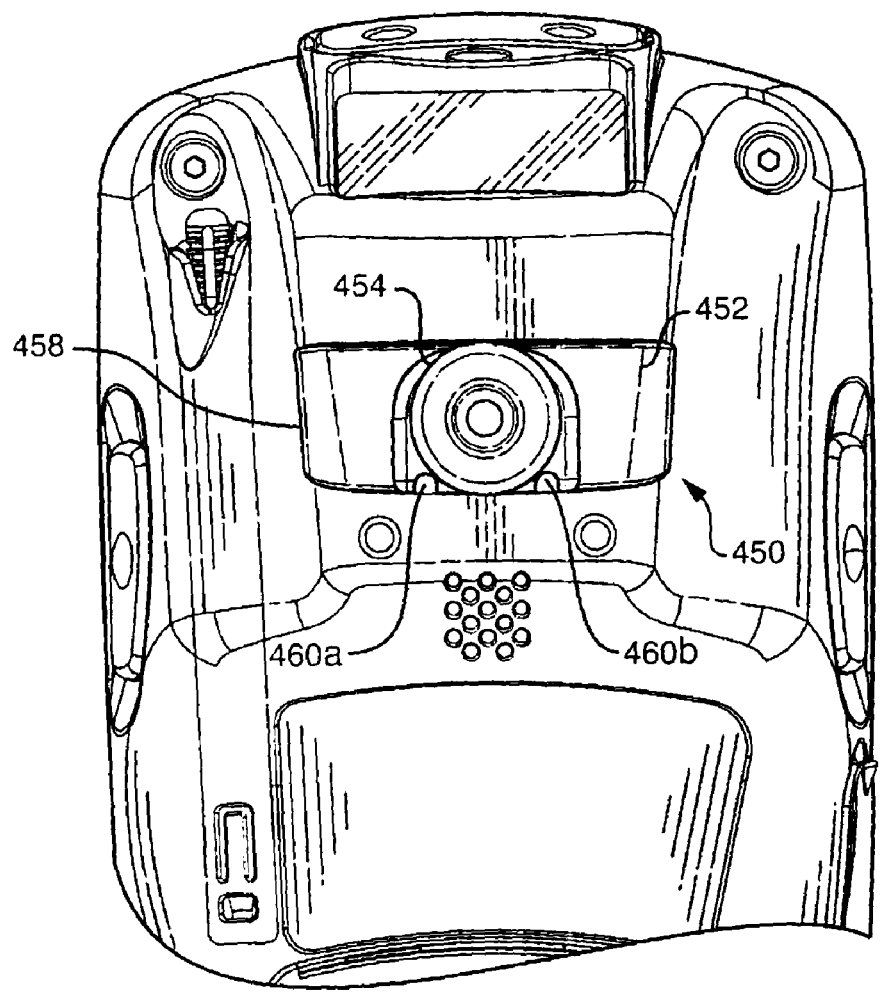
FIG. 4d is an isometric view of an alternative accessory interface as installed in a PDT.
Figure 4E:
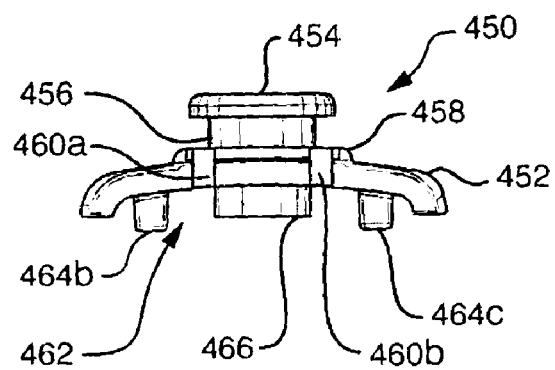
FIG. 4e is a front view of the alternative accessory interface.

FIG. 4d is an isometric view of an alternative accessory interface 450 as installed in a PDT 300. FIG. 4e is a front view of the alternative accessory interface 450. The accessory interface 450 is similar to the accessory interface 314 in that it generally comprises a body 452 connected to a disc 454 via a column 456. The accessory interface 450 also incorporates a platform 458 through which openings 460a and 460b are formed. The openings 460a and 460b are sized to permit the passage of, for example, the loop 406 of the hand strap 400. It is to be noted that the platform 458 facilitates the uses of a belt clip 410 or an accessory bracket 420 while the hand strap 400 or 401 is installed.

The body 452 of the accessory interface 450 is curved to match the housing 302 and the groove 336. The body 452 i defines a space 462 which, when the accessory interface is secured in the groove 336, will create a gap accommodating the loop 406. To secure the accessory interface 450, two columns 464a and 464b are provided. Two reciprocal indentations may be provided in the groove 336 for mating with the columns 464a and 464b. A column 466 extends from the center of the body 452 into the space 462. The column 466 accommodates a screw 468 which secures the accessory interface 450 into the groove 336. The column 466 also secures the end of the hand strap.

FIGS. 5a through 5f are side views of battery housings in accordance with embodiments of the present invention. These views illustrate a variety of features that may be incorporated into battery housings in accordance with the present invention. These views also illustrate the concept that a surface of the battery housing contributes to the ergonomics of the PDT and by swapping batteries, different ergonomic configurations may be provided.

Figure 5A:
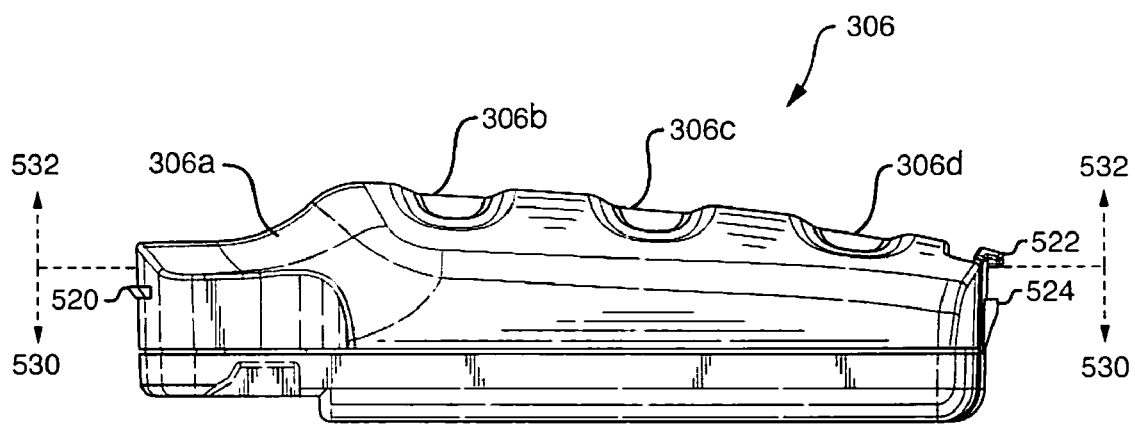
FIGS. 5a through 5g are side views of battery housings in accordance with embodiments of the present invention.

FIG. 5a is a side view of the battery pack 306, partially illustrated in FIGS. 3a through 3c. In addition to the features discussed herein above, the illustrated configuration has one or more protrusions 520 which, when inserted, engage reciprocal reliefs in the housing 302 (not illustrated). The illustrated configuration also includes an integrally molded locking tab 522 with one or more protrusions 504 that when inserted, are biased toward and engage reciprocal reliefs (also not illustrated) in the housing 302.

Figure 5B:
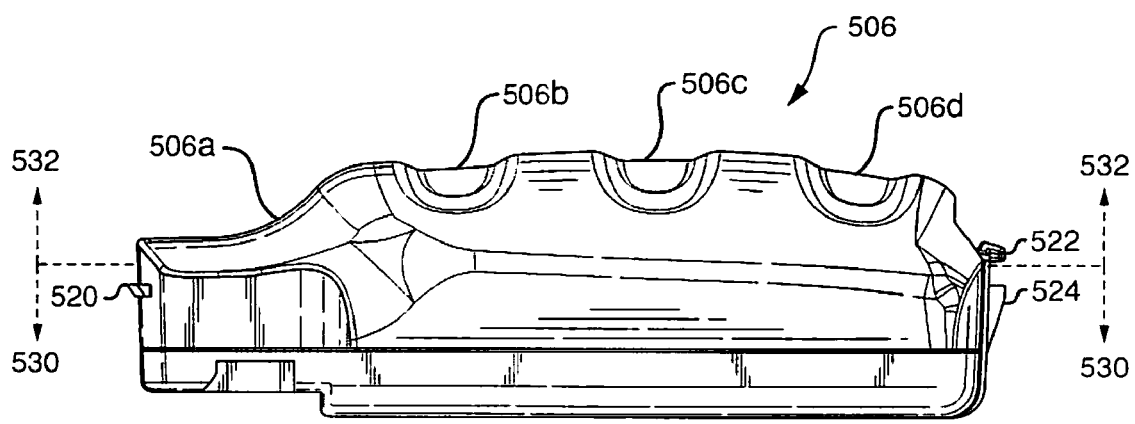

FIG. 5b is a side view of a high capacity battery pack 506. As with the battery pack 306, a finger saddle is formed by the battery pack 506 when inserted into the lower housing 302. In particular, the battery pack 506 forms a curved ridge 506a defining a first curved shape of the finger saddle. The curved ridge 506a supports a user's finger in a comfortable position. The remaining fingers of a users hand will generally rest on the battery pack 506 engaging with one or more finger grooves, such as the grooves 506b, 506c, and 506d. The illustrated configuration also includes an integrally molded locking tab 522 with one or more protrusions 504 that, when inserted, are biased toward and engage reciprocal reliefs (also not illustrated) in the housing 302.

Batteries such as batteries 500 and 306 may differ in shape and volume. The batteries 306 and 506 may be though of as having two portions: a mating portion 530 that is inserted into and secured by the housing 302 and a surface portion 532 that forms a gripping surface for the PDT. The mating portion 530 will remain somewhat dimensionally stable (within manufacturing tolerances) across multiple batteries (at least for any given housing). The surface portion 532 may be dimensionally modified to provide a variety of ergonomic configurations. While the illustrated examples both have been shaped to blend with the edges of the housing 302, the surface portions of any given battery need not blend with the housing 302.

In the batteries illustrated in FIGS. 5a and 5b, the upper surface of the battery pack 306 slopes from forward to back, while the upper surface of the battery pack 506 either lacks such a slope or has a differently shaped slope (in the illustrated example, the overall shape is a somewhat level convex shape. While providing different ergonomic experiences, the battery pack 506 also offers an increased internal volume facilitating the provision of larger (e.g. longer lasting) cells.

It is to be understood that batteries may be designed that differ in height, shape, and/or scale. In general the shape of the upper surface 520n may take on any desired form—examples of which are illustrated hereinafter. It is also to be understood that while the batteries 306 and 506, as illustrated, are of a size corresponding to the battery well in the lower housing 302, that any particular battery need not be so limited. It is further possible to use the accessory interface 314, the accessory interface 450 or the groove 314 to assist with securing a battery having a housing that exceeds the foot print of the battery well.

Figure 5C:
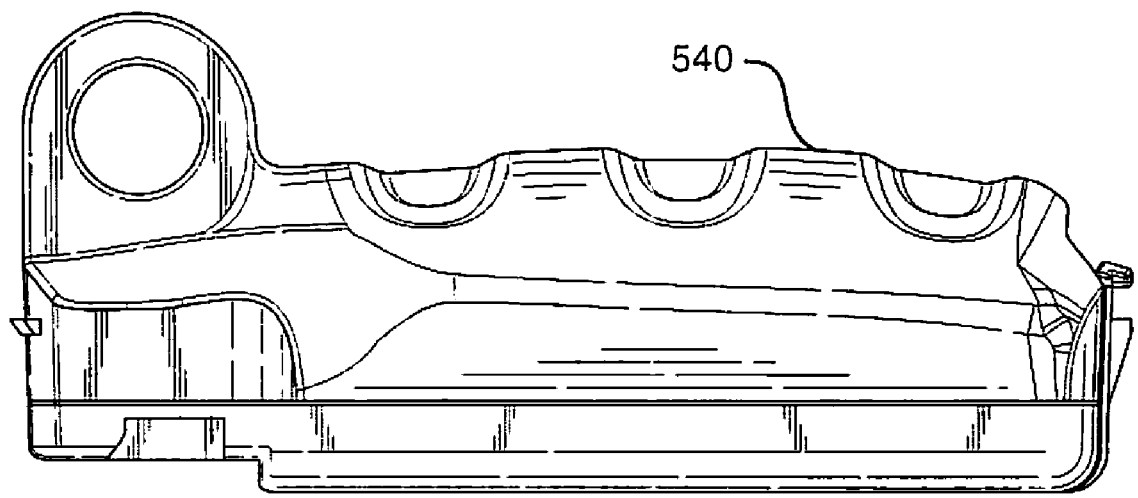
Figure 5D:
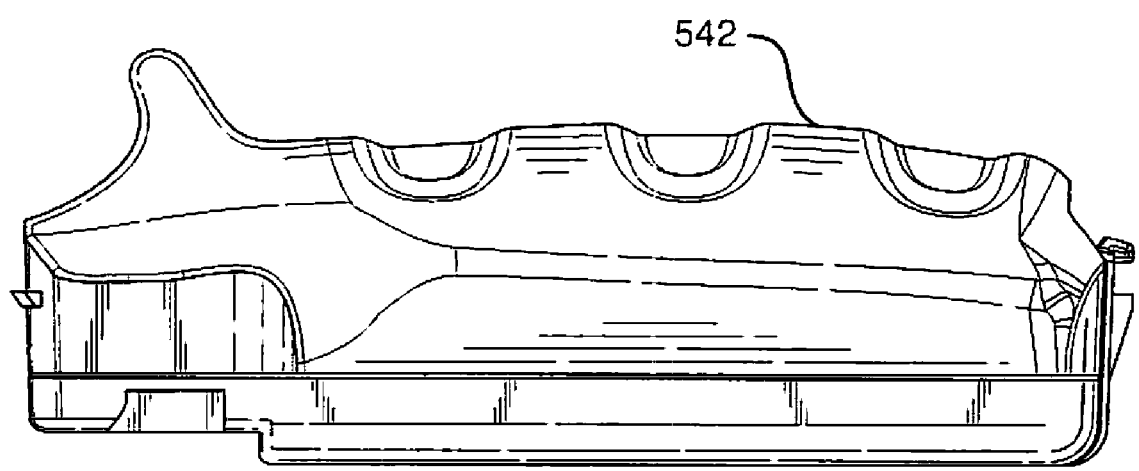
Figure 5E:
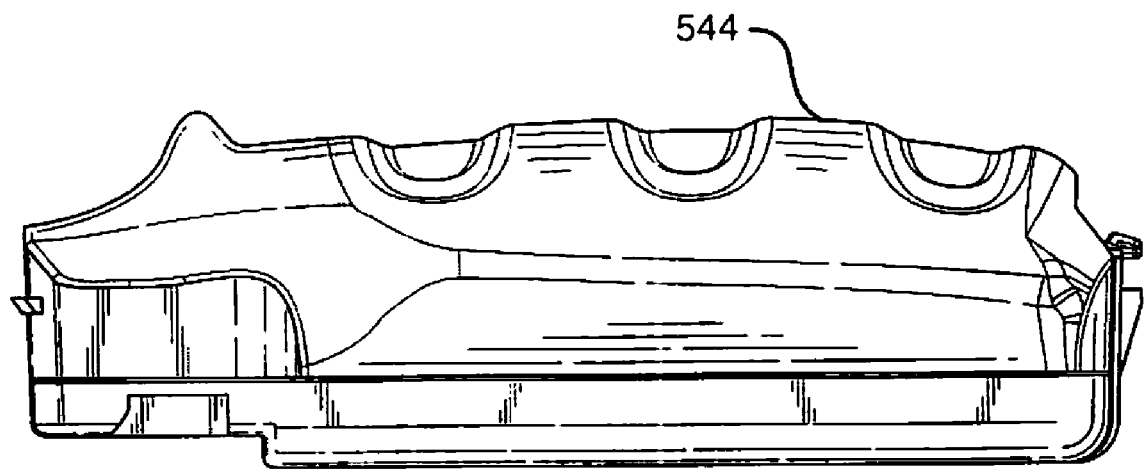
Figure 5F:
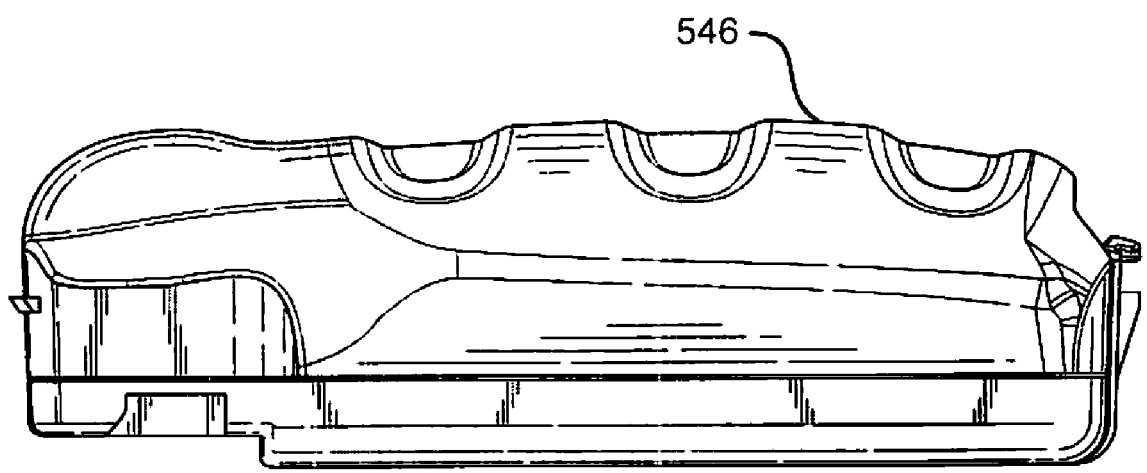
Figure 5G:
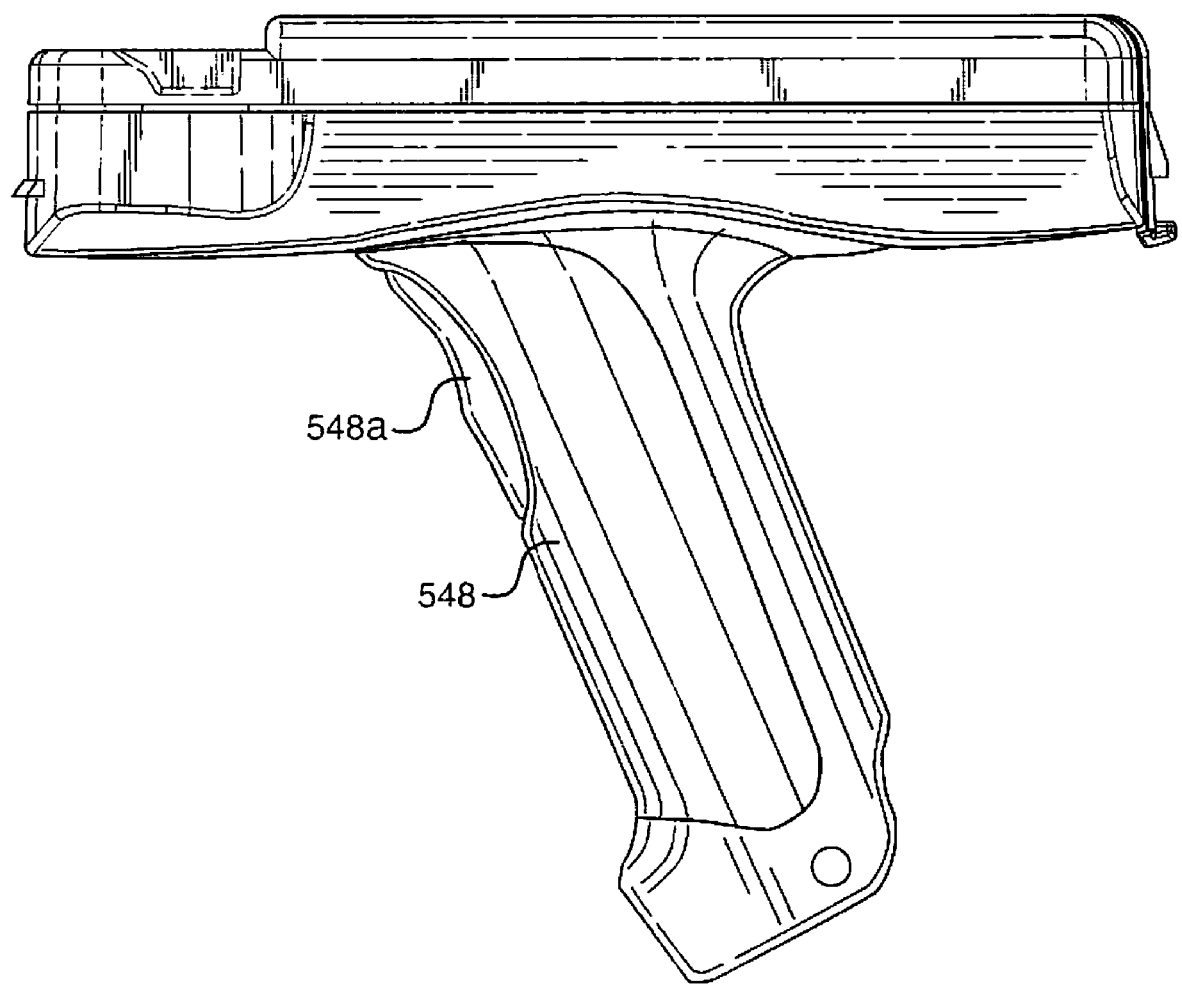

FIGS. 5c through 5g present examples of possible alternative embodiments in which the shape of the battery housing is adjusted to satisfy different needs of different users. To achieve varying ergonomics and/or functions a user simply swaps battery packs. FIG. 5c illustrates a battery housing 540 forming an opening into which a user's finger is inserted. This embodiment may prove useful in harsher environments to shield a user's finger and provide increased holdability. FIG. 5d illustrates a battery housing 542 forming a pronounced finger ridge. This embodiment may be further enhanced by the addition of an optional trigger with in the ridge (please note that the trigger may be added to any disclosed embodiment). FIG. 5e illustrates a battery housing 544 forming a low profile finger ridge. This embodiment may prove useful where increased holdability is desired, but size is a concern. FIG. 5f illustrates a battery housing 546 that utilizes a reverse curve on the ridge that forms the finger saddle. FIG. 5g illustrates a battery housing 548 forming a vertical grip. In this case a trigger 548a may be integrated to provide an activation signal to the attached PDT. This configuration also illustrates a battery housing exceeding the foot print of the battery well.

Figure 6A:
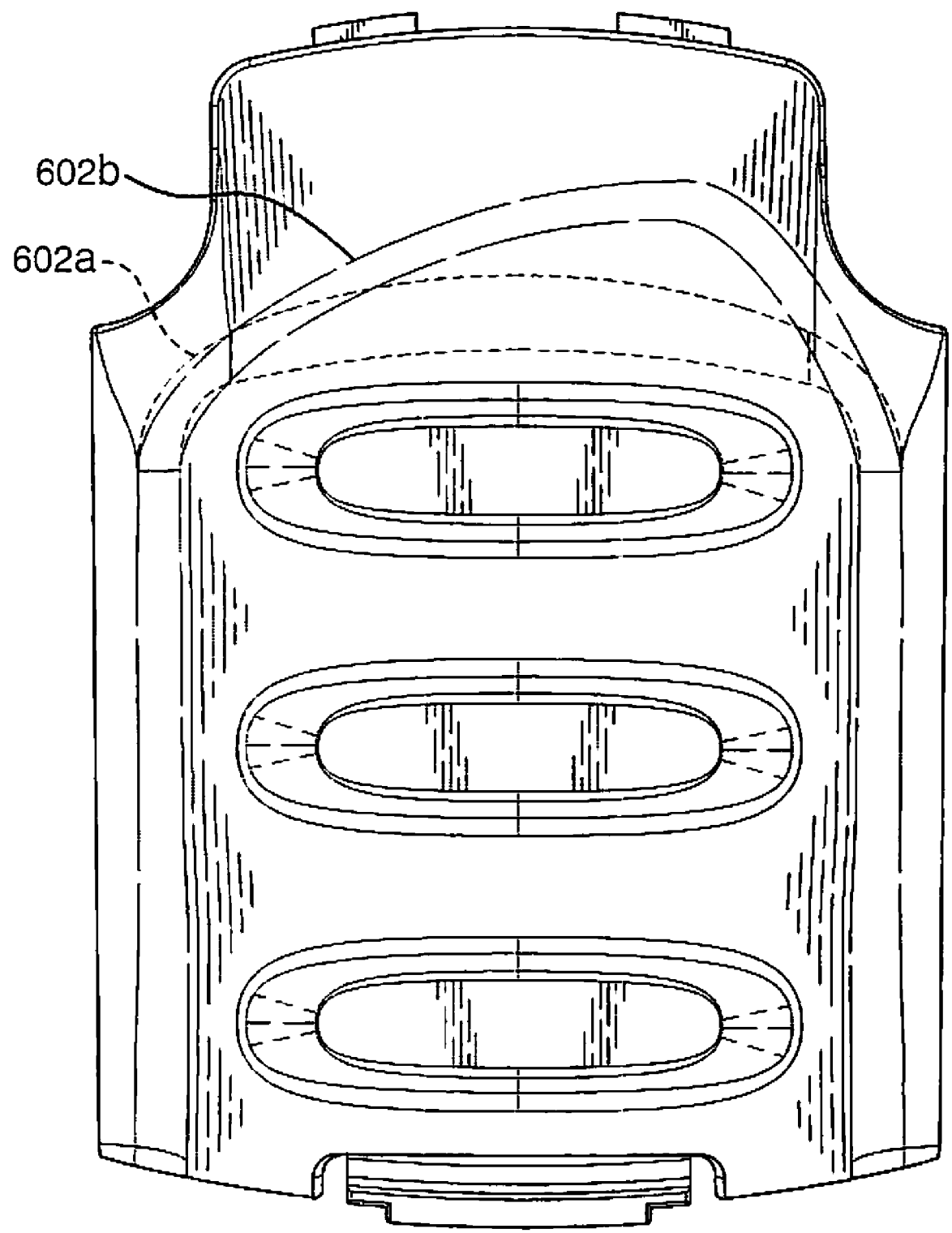
FIGS. 6a and 6b are plan views of batteries in accordance with embodiments of the present invention.
Figure 6B:
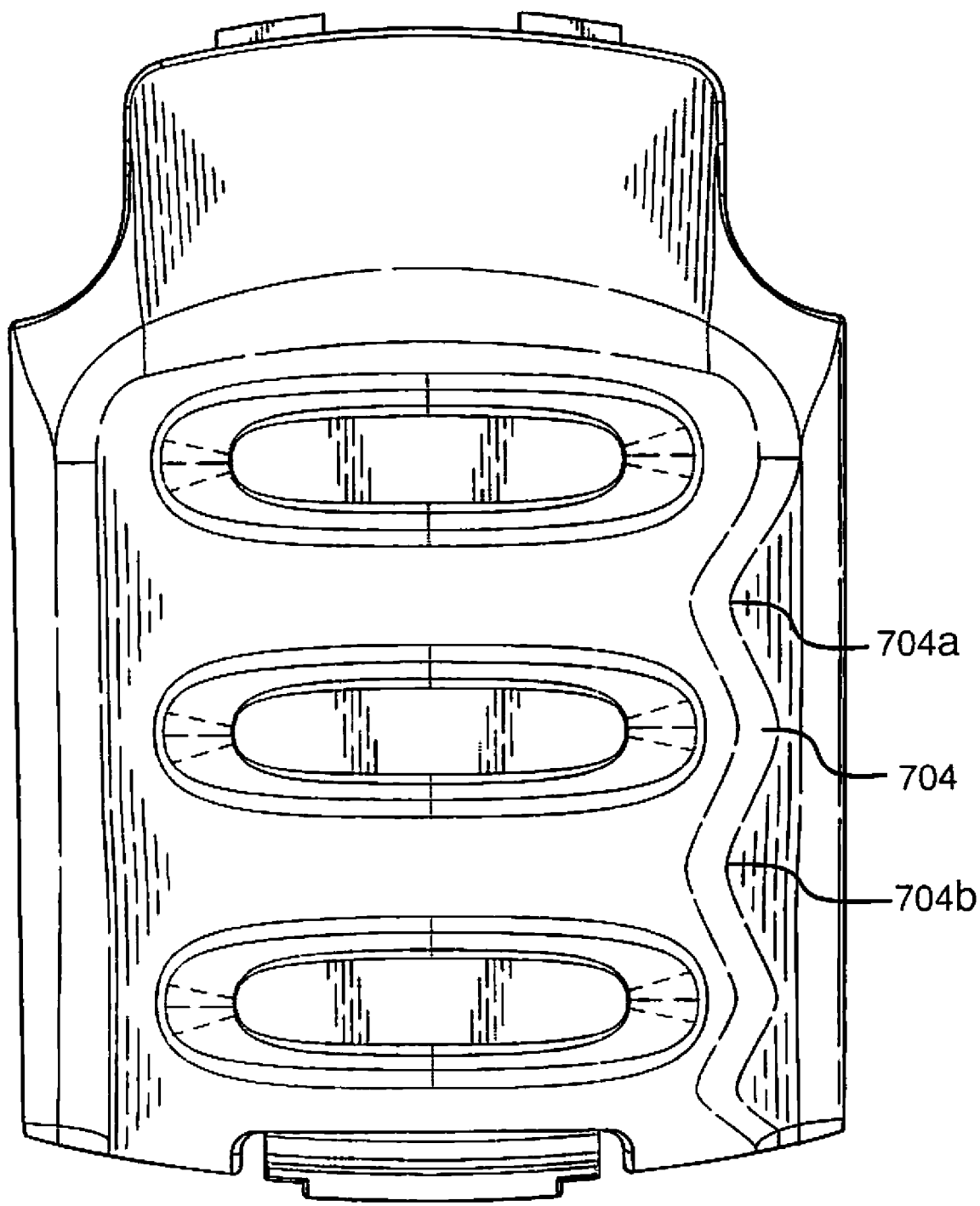

FIGS. 6a and 6b are plan views of battery packs in accordance with embodiments of the present invention. FIG. 6a illustrates a battery pack 602 with a finger groove having an asymmetrical shape (in the plan view) that may prove useful for left-handed users. The standard symmetrical profile is illustrated in a dashed line to facilitate comparison. A similar, but flipped, asymmetrical profile may be useful for right handed users. FIG. 6b illustrates a battery pack 604 that includes a finger dent 604a for receiving finger tips (those not placed within the finger saddle) of a user.

Although some embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A housing for a portable computing device, the housing comprising:
   an upper surface facilitating access to at least one interface component;
   a lower surface defining a cavity to receive a battery;
   a first battery pack, adapted to fit within the cavity, having a housing defining: a mating portion that is inserted into the cavity and secured by said housing and a surface portion that forms a gripping surface for the portable computing device, the surface portion having a first ridge for receiving an operator's finger, the first ridge having a generally curved configuration to form a finger saddle when said battery pack is inserted into said cavity and enabling said housing to be comfortably held in an operator's hand when the operator's hand is in its naturally relaxed position.

2. A housing according to claim 1 wherein said lower surface further defines a second ridge forward of the first ridge thereby defining a finger saddle generally perpendicular to a longitudinal axis thereof.

3. A housing according to claim 2 wherein said first ridge has a generally U-shaped configuration with sufficiently height to support at least one of an operator's fingers.

4. A housing according to claim 1 further comprising a second battery pack interchangeable with the first battery pack, the second battery pack having a shape different than a shape of the first battery pack.

5. A housing according to claim 4 wherein a slope of an exposed surface on the first battery pack differs from a slope of an exposed surface on the second battery pack.

6. A housing according to claim 1 wherein the first battery pack further comprises finger grooves to the rear of the first ridge.

7. A housing according to claim 1 wherein said lower housing supports a data acquisition device.

8. A housing according to claim 7 wherein one of said interface components comprises a display.

9. A housing according to claim 7 further comprising an activation switch positioned on said upper surface in general axial alignment with said first ridge so as to allow activation of said activation switch by natural movement of an operator's thumb.

10. A housing according to claim 1 wherein one of said interface components comprises a keypad.

11. A housing according to claim 1 wherein one of said interface components comprises a touch screen.

12. A housing according to claim 1 further comprising an activation switch positioned on the first ridge so as to allow activation of said activation switch by natural movement of an operator's finger within said finger saddle.

13. A housing according to claim 1 wherein said first ridge is positioned adjacent a center portion of said housing.

14. A housing according to claim 1 further comprising an accessory interface positioned on the lower housing.

15. A housing according to claim 14 wherein said accessory interface comprises a column extending from the lower housing and a disc attached to the column opposite the lower housing, wherein the disc has a larger diameter than a portion of the column next to the disc.

16. A housing according to claim 14 wherein said accessory interface further comprises an electrical interface.

17. A housing according to claim 14 wherein said accessory interface is formed on an insert that is removable from the lower housing without excessive force.

18. A housing according to claim 14 further comprising a belt loop that interfaces a belt of a user and the accessory interface.

19. A housing
   an upper surface facilitating access to at least one interface component;
   a lower surface defining a cavity to receive a battery;
   a first battery pack, adapted to fit within the cavity, having a housing defining a first ridge for receiving an operator's finger, the first ridge having a generally curved configuration enabling said housing to be comfortably held in an operator's hand when the operator's hand is in its naturally relaxed position;
   a second battery pack interchangeable with the first battery pack, the second battery pack having a shape different than a shape of the first battery pack; and,
   an accessory bracket that mechanically and electrically connects to the accessory interface.

20. A portable data terminal comprising:
   a housing having an upper surface facilitating access to at least one interface component and a lower surface defining a cavity, the lower surface further defining an opening through which a data collection device operates;
   a first battery pack, adapted to fit within the cavity, defining a first ridge for receiving an operator's finger, the first ridge having a generally curved configuration enabling said housing to be comfortably held in an operator's hand when the operator's hand is in its naturally relaxed position; and
   a second battery pack, adapted to fit within the cavity, defining a second ridge having a generally curved configuration enabling said housing to be comfortably held in an operator's hand when the operator's hand is in its naturally relaxed position, the second battery pack having a different shape than the first battery pack.

21. A portable data terminal according to claim 20 further comprising an accessory interface on the lower housing.

22. A portable data terminal according to claim 21 wherein said accessory interface comprises a column extending from the lower housing and a disc attached to the column opposite the lower housing, wherein the disc has a larger diameter than a portion of the column next to the disc.

23. A portable data terminal according to claim 21 wherein said accessory interface further comprises an electrical interface.

24. A portable data terminal according to claim 21 wherein said accessory interface is formed on an insert that is removable from the lower housing without the use of excessive force.

25. A portable data terminal (PDT) system comprising:
a keypad;
a display;
a data acquisition device;
a PDT housing supporting the keypad, display, and data acquisition device; and
a plurality of battery packs that form a portion of a surface of the portable data terminal, each battery pack (BP) having a BP housing defining: a mating portion that is inserted into a cavity of the BP housing and secured by said BP housing and a surface portion that forms a gripping surface for the PDT, the surface portion having a first ridge for receiving an operator's finger, the first ridge having a generally curved configuration to form a finger saddle when said BP is inserted into said cavity and enabling said PDT housing to be comfortably held in an operator's hand when the operator's hand is in its naturally relaxed position.

26. A portable data terminal, as set forth in claim 25, wherein at least one battery pack defines a circular hole traverse to a longitudinal axis of the portable data terminal, the hole for receiving a finger of a user.

27. A portable data terminal, as set forth in claim 25, wherein at least one battery pack has a pronounced finger ridge and a second battery pack has a low profile finger ridge.

28. A portable data terminal, as set forth in claim 25, wherein at least one battery pack has an asymmetrical finger ridge.

29. A portable data terminal, as set forth in claim 25, wherein at least one battery pack forms a vertical grip.

30. A portable data terminal, as set forth in claim 25, wherein at least one battery pack includes indentations on a side thereof to accept the finger tips of a user.

31. A portable data terminal as set forth in claim 25, wherein at least one battery pack forms a finger ridge with a convex curve.

32. A portable data terminal, as set forth in claim 25, wherein at least one battery pack forms a finger ridge with a concave curve.

* * * * *